(12) United States Patent
Zhang et al.

(10) Patent No.: US 11,878,685 B2
(45) Date of Patent: Jan. 23, 2024

(54) VEHICLE CONTROL METHOD AND APPARATUS, ELECTRONIC DEVICE AND SELF-DRIVING VEHICLE

(71) Applicant: Beijing Baidu Netcom Science and Technology Co., Ltd., Beijing (CN)

(72) Inventors: Lei Zhang, Beijing (CN); Kai Yang, Beijing (CN); Qijuan Yin, Beijing (CN); Wuzhao Zhang, Beijing (CN); Xiaoyan Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 189 days.

(21) Appl. No.: 17/371,841

(22) Filed: Jul. 9, 2021

(65) Prior Publication Data

US 2021/0331673 A1 Oct. 28, 2021

(30) Foreign Application Priority Data

Dec. 22, 2020 (CN) .......................... 202011524698.9

(51) Int. Cl.
*B60W 30/14* (2006.01)
*B60W 60/00* (2020.01)
(Continued)

(52) U.S. Cl.
CPC .......... *B60W 30/143* (2013.01); *B60W 10/18* (2013.01); *B60W 30/09* (2013.01);
(Continued)

(58) Field of Classification Search
CPC .... B60W 30/143; B60W 10/18; B60W 30/09; B60W 30/0953; B60W 40/105;
(Continued)

(56) References Cited

U.S. PATENT DOCUMENTS 11,016,492 B2 * 5/2021 Gier ........................ G06V 20/58
11,402,844 B2 * 8/2022 Oguro .................. G05D 1/0257
(Continued)

FOREIGN PATENT DOCUMENTS

CN 107145147 A 9/2017
CN 107554504 A 1/2018
(Continued)

OTHER PUBLICATIONS

English Machine Translation of CN107145147A. (24 Pages).
(Continued)

*Primary Examiner* — Angelina Shudy
*Assistant Examiner* — Mohamed Abdo Algehaim
(74) *Attorney, Agent, or Firm* — Maginot, Moore & Beck LLP

(57) ABSTRACT

A vehicle control method, a vehicle control apparatus, an electronic device and a self-driving vehicle all relates to the field of self-driving and intelligent transportation technologies. The method includes: when a vehicle is moving, in a case that an occluding object is detected, determining a hard brake speed limit point and a potential collision point according to a planned path of the vehicle and position information of the occluding object; calculating a speed limit value of the hard brake speed limit point based on a distance between the hard brake speed limit point and the potential collision point; in a case that a planned speed of the vehicle at the hard brake speed limit point is less than or equal to the speed limit value, controlling the vehicle to move at the planned speed.

14 Claims, 3 Drawing Sheets

(51) Int. Cl.
  *B60W 10/18* (2012.01)
  *B60W 30/09* (2012.01)
  *B60W 30/095* (2012.01)
  *B60W 40/105* (2012.01)
  *B60W 50/00* (2006.01)

(52) U.S. Cl.
  CPC ...... *B60W 30/0953* (2013.01); *B60W 40/105* (2013.01); *B60W 50/00* (2013.01); *B60W 60/0015* (2020.02); *B60W 2050/0054* (2013.01); *B60W 2554/4041* (2020.02); *B60W 2554/80* (2020.02)

(58) Field of Classification Search
  CPC .............. B60W 50/00; B60W 60/0015; B60W 2050/0054; B60W 2554/4041; B60W 2554/80; B60W 2554/20; B60W 2554/40; B60W 2554/4026; B60W 2554/4029; B60W 2554/404; B60W 2554/4042; B60W 2554/4045; B60W 2554/4048; B60W 2554/4049; B60W 2554/801; B60W 30/0956; B60W 60/00274; B60W 30/08; B60W 30/146; B60W 40/107; B60W 2050/0005; B60W 2520/10; B60W 2720/10; B60Y 2302/05; G05D 1/0223; G05D 2201/0212
  USPC ............................................................ 701/93
  See application file for complete search history.

(56) References Cited

U.S. PATENT DOCUMENTS

| | | | |
|---|---|---|---|
| 2002/0003489 A1* | 1/2002 | Samukawa | G08G 1/167 342/72 |
| 2006/0085125 A1 | 4/2006 | Shibata et al. | |
| 2012/0022759 A1* | 1/2012 | Inoue | B60T 7/22 701/70 |
| 2014/0188365 A1* | 7/2014 | Nagata | B60W 30/143 701/93 |
| 2014/0195141 A1* | 7/2014 | Nagata | B60T 7/22 701/301 |
| 2015/0142285 A1 | 5/2015 | Nagata et al. | |
| 2015/0153735 A1* | 6/2015 | Clarke | G06T 7/70 701/301 |
| 2015/0329044 A1* | 11/2015 | Bernstein | G08G 1/165 340/435 |
| 2016/0132734 A1* | 5/2016 | Lee | G06V 20/584 382/104 |
| 2016/0221573 A1* | 8/2016 | Prokhorov | B60W 30/18154 |
| 2017/0327094 A1* | 11/2017 | Inoue | B60W 30/09 |
| 2018/0052458 A1* | 2/2018 | Tsuji | B60W 30/143 |
| 2018/0093650 A1* | 4/2018 | Payne | B60T 8/172 |
| 2018/0096602 A1* | 4/2018 | She | G05D 1/0295 |
| 2018/0259968 A1* | 9/2018 | Frazzoli | G06V 20/58 |
| 2018/0326956 A1* | 11/2018 | Zhu | B60T 8/00 |
| 2018/0326995 A1* | 11/2018 | Hiramatsu | G05D 1/0088 |
| 2019/0039591 A1* | 2/2019 | Raveendran | B60W 10/06 |
| 2019/0106103 A1* | 4/2019 | Inoue | B60K 31/0008 |
| 2019/0106104 A1* | 4/2019 | Inoue | B60T 7/22 |
| 2019/0250263 A1* | 8/2019 | Watanabe | B60W 30/0956 |
| 2019/0250626 A1* | 8/2019 | Ghafarianzadeh | G06N 7/01 |
| 2019/0276021 A1* | 9/2019 | Noda | H04N 7/183 |
| 2019/0278290 A1* | 9/2019 | Zhang | G01S 7/40 |
| 2019/0384302 A1* | 12/2019 | Silva | G06T 7/10 |
| 2020/0151958 A1* | 5/2020 | Livneh | G06T 5/008 |
| 2020/0269877 A1* | 8/2020 | Mortazavi | G08G 1/0116 |
| 2020/0278681 A1* | 9/2020 | Gier | G05D 1/0246 |
| 2020/0307566 A1* | 10/2020 | Ghose | B60W 30/09 |
| 2020/0331477 A1* | 10/2020 | Clarke | B60W 30/09 |
| 2020/0349366 A1* | 11/2020 | Takemura | B60Q 9/00 |
| 2021/0027629 A1* | 1/2021 | Tao | G06V 20/58 |
| 2021/0031760 A1* | 2/2021 | Ostafew | B60W 60/0017 |
| 2021/0034063 A1* | 2/2021 | Oguro | G05D 1/0214 |
| 2021/0094539 A1* | 4/2021 | Beller | G08G 1/167 |
| 2021/0094577 A1* | 4/2021 | Shalev-Shwartz | B60W 30/0953 |
| 2021/0157332 A1* | 5/2021 | Cox | G08G 1/164 |
| 2021/0276589 A1* | 9/2021 | Zhu | B60W 30/0956 |
| 2022/0012466 A1* | 1/2022 | Taghavi | G06F 18/2163 |
| 2022/0161787 A1* | 5/2022 | Kinoshita | G06V 20/58 |
| 2022/0185266 A1* | 6/2022 | Shah | B60W 30/0956 |
| 2022/0194364 A1* | 6/2022 | Ohno | B60W 30/09 |
| 2022/0234578 A1* | 7/2022 | Das | B60W 30/0953 |
| 2022/0314968 A1* | 10/2022 | Horita | G08G 1/167 |
| 2022/0324439 A1* | 10/2022 | Ghose | G08G 1/167 |
| 2023/0021615 A1* | 1/2023 | Inaba | B60W 30/09 |

FOREIGN PATENT DOCUMENTS

| | | |
|---|---|---|
| CN | 109314763 A | 2/2019 |
| CN | 109817021 A | 5/2019 |
| CN | 109878517 A | 6/2019 |
| CN | 110103967 A | 8/2019 |
| CN | 110293968 A | 10/2019 |
| CN | 110488802 A | 11/2019 |
| CN | 111098842 A | 5/2020 |
| CN | 111260915 A | 6/2020 |
| CN | 111497840 A | 8/2020 |
| CN | 111547035 A | 8/2020 |
| JP | 2006112962 A | 4/2006 |
| JP | 2014002460 A | 1/2014 |
| JP | 2014201252 A | 10/2014 |
| JP | 2019064563 A | 4/2019 |
| WO | 2020035728 A2 | 2/2020 |
| WO | 2020147486 A1 | 7/2020 |

OTHER PUBLICATIONS

English Machine Translation of CN110293968A. (28 Pages).
English Machine Translation of CN110488802A. (37 Pages).
Chinese Office Action corresponding to Chinese Patent Application No. 202011524698.9, dated Oct. 9, 2022 (9 pages).
Machine Translation of Chinese Office Action corresponding to Chinese Patent Application No. 202011524698.9, dated Oct. 9, 2022 (7 pages).
English Machine Translation of CN111497840A. (30 Pages).
English Machine Translation of CN111260915A. (22 Pages).
English Machine Translation of CN111098842A. (24 Pages).
English Machine Translation of CN110103967A. (63 Pages).
English Machine Translation of CN111547035A. (32 Pages).
English Machine Translation of CN107554504A. (9 Pages).
English Machine Translation of CN109878517A. (13 Pages).
Xichan, Z. H. U., L. I. U. Zhichao, and L. I. Lin. "Evasive manoeuvre for emergency steering based on typical vehicle-pedestrian use case." Journal of Automotive Safety and Energy 6.03 (2015): 217.
Nengchao, L. Y. U., et al. "Pedestrian-vehicle collision avoidance approach based on cooperative vehicle infrastructure system [J]." Chinese Journal of Safety Sciences 25.1 (2015): 60-66.
Extended European Search Report corresponding to European Patent Application No. 21184306.5, dated Dec. 21, 2021 (8 pages).
Japanese Office Action corresponding to Japanese Patent Application No. 2021179912, dated Jan. 31, 2023 (3 pages).
Machine Translation of Japanese Office Action corresponding to Japanese Patent Application No. 2021179912, dated Jan. 31, 2023 (3 pages).
Korean Office Action corresponding to Korean Patent Application No. 1020210089380, dated Feb. 27, 2023 (7 pages).
Machine Translation of Korean Office Action corresponding to Korean Patent Application No. 1020210089380, dated Feb. 27, 2023 (8 pages).
English Machine Translation of JP2014201252A. (15 Pages).

* cited by examiner

VEHICLE CONTROL METHOD AND APPARATUS, ELECTRONIC DEVICE AND SELF-DRIVING VEHICLE

CROSS-REFERENCE TO RELATED APPLICATION

The present application claims a priority to the Chinese patent application No. 202011524698.9 filed in China on Dec. 22, 2020, a disclosure of which is incorporated herein by reference in its entirety.

TECHNICAL FIELD

The present application relates to the field of vehicle technologies, specifically, the field of self-driving and intelligent transportation technologies, and relates in particular to a vehicle control method, a vehicle control apparatus, an electronic device and a self-driving vehicle.

BACKGROUND

The perceived field of view of a moving self-driving vehicle may be compromised by an occluding object, e.g., the field of view may be occluded by a car parking at the roadside. Since a vehicle cannot sense in advance an event in the area occluded by the occluding object (i.e., the occluded area), when the vehicle moves near the occluding object, a collision accident may happen if a pedestrian or bicycle emerges suddenly from the occluded area.

SUMMARY

The present application provides a vehicle control method, a vehicle control apparatus, an electronic device, a storage medium, a computer program product and a self-driving vehicle.

According to a first aspect, the present application provides a vehicle control method. When a vehicle is moving, in a case that an occluding object is detected, a hard brake speed limit point and a potential collision point is determined according to a planned path of the vehicle and position information of the occluding object, wherein a movement speed of the occluding object is less than or equal to a first threshold, and the hard brake speed limit point is a closest position where an area occluded by the occluding object is detectable. The method also includes calculating a speed limit value of the hard brake speed limit point based on a distance between the hard brake speed limit point and the potential collision point. Furthermore, in a case that a planned speed of the vehicle at the hard brake speed limit point is less than or equal to the speed limit value, the vehicle is controlled to move at the planned speed.

According to a second aspect, the present application provides a vehicle control apparatus, including determination, calculation, and control modules. The determination module is configured to, when a vehicle is moving, in a case that an occluding object is detected, determine a hard brake speed limit point and a potential collision point according to a planned path of the vehicle and position information of the occluding object, wherein a movement speed of the occluding object is less than or equal to a first threshold, and the hard brake speed limit point is a closest position where an area occluded by the occluding object is detectable. The calculation module is configured to calculate a speed limit value of the hard brake speed limit point based on a distance between the hard brake speed limit point and the potential collision point. The control module, configured to, in a case that a planned speed of the vehicle at the hard brake speed limit point is less than or equal to the speed limit value, control the vehicle to move at the planned speed.

According to a third aspect, the present application provides an electronic device, including at least one processor and a memory communicatively connected to the at least one processor. The memory stores an instruction (or instructions) executable by the at least one processor, and the instruction or instructions is/are executed by the at least one processor to cause the at least one processor to implement the method of the first aspect.

According to a fourth aspect, the present application provides a non-transitory computer readable storage medium storing therein a computer instruction or computer instructions, wherein the computer instruction/instruction is/are configured to cause a computer to implement the method of the first aspect.

According to a fifth aspect, the present application provides a computer program product including a computer program, wherein, when the computer program is run by a processor, the processor implements the method of the first aspect.

According to a sixth aspect, the present application provides a self-driving vehicle, including the electronic device of the third aspect.

According to the techniques of the present application, a potential risk of collision of a moving vehicle as a result of occlusion of an occluding object can be predicted, and the safety of vehicle autonomous driving can be improved.

It should be understood that the content described in this section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the solution, and do not constitute a limitation on the present application.

DETAILED DESCRIPTION

The following describes exemplary embodiments of the present application with reference to the accompanying drawings, which include various details of the embodiments of the present application to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

In the related art, a vehicle cannot sense in advance an area occluded by an occluding object, and there may be a moving object, such as a pedestrian, animal, or bicycle, about to emerge from behind the occluding object or emerging from behind the occluding object in the area occluded by the occluding object. Since the vehicle cannot sense in advance the area occluded by the occluding object, the vehicle cannot detect the moving object in the occluded area in advance, and then the vehicle cannot predict a potential risk of collision of a moving vehicle as a result of occlusion of an occluding object. When the vehicle moves near the occluding object, a moving object in the occluded area may suddenly move to a position in front of the vehicle, in this case, the vehicle may not stop timely, and may collide with the moving object, leading to a collision accident. Therefore, the safety of vehicle autonomous driving is undesirable.

In view of the above, the present application provides a vehicle control method, a vehicle control apparatus, an electronic device, a storage medium, a computer program product and a self-driving vehicle, so as to predict a potential risk of collision of a moving vehicle as a result of occlusion of an occluding object, and improve the safety of vehicle autonomous driving.

Exemplary embodiments of the present application are described hereinafter.

Figure 1:
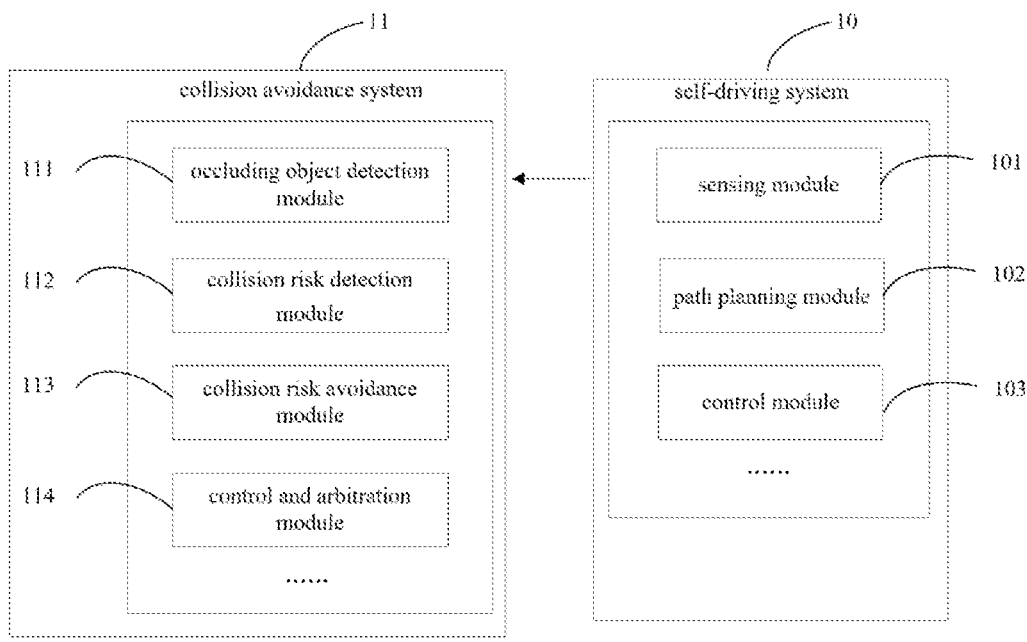
FIG. 1 is an architecture diagram of a vehicle according to a first embodiment of the present application.

The vehicle in the present application may be a self-driving vehicle, and may adopt an architecture as shown in FIG. 1.

As shown in FIG. 1, the vehicle may be provided with a self-driving system 10 and a collision avoidance system 11. The self-driving system 10 may include a sensing module 101, a path planning module 102 and a control module 103. The collision avoidance system 11 may include an occluding object detection module 111, a collision risk detection module 112, a collision risk avoidance module 113 and a control and arbitration module 114. The occluding object detection module 111 may be a sensor or laser radar configured to detect position and speed of an object.

Figure 2:
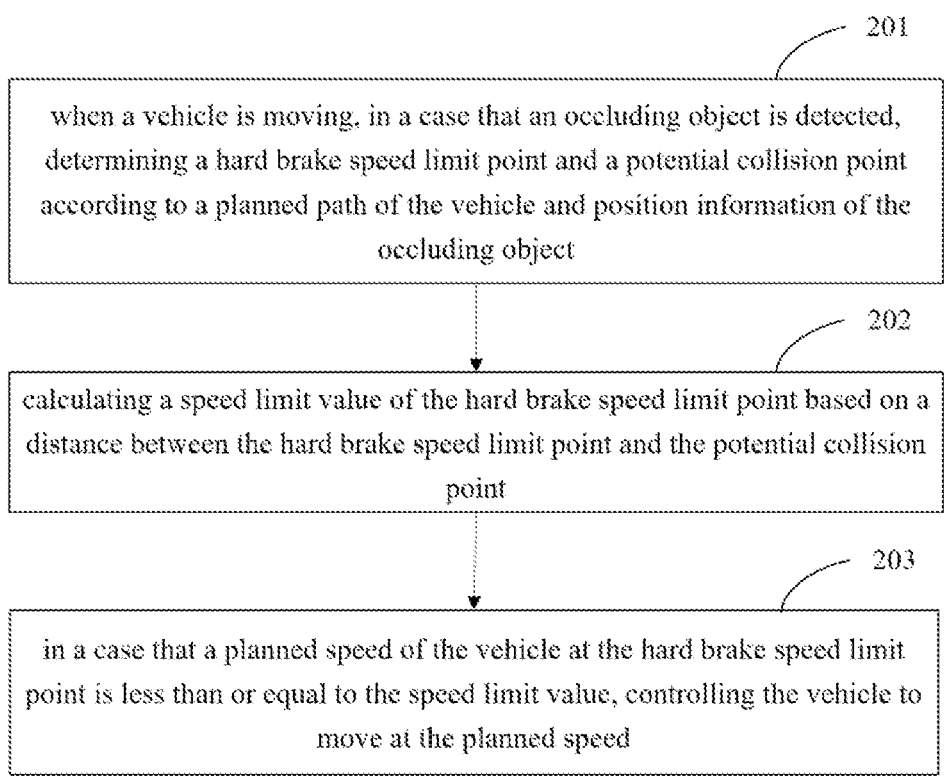
FIG. 2 is a flow diagram of a vehicle control method according to a first embodiment of the present application.

As shown in FIG. 2, the vehicle control method includes following steps 201, 202 and 203.

Step 201: when a vehicle is moving, in a case that an occluding object is detected, determining a hard brake speed limit point and a potential collision point according to a planned path of the vehicle and position information of the occluding object, wherein a movement speed of the occluding object is less than or equal to a first threshold, and the hard brake speed limit point is a closest position where an area occluded by the occluding object is detectable.

Step 202: calculating a speed limit value of the hard brake speed limit point based on a distance between the hard brake speed limit point and the potential collision point.

Step 203: in a case that a planned speed of the vehicle at the hard brake speed limit point is less than or equal to the speed limit value, controlling the vehicle to move at the planned speed.

A vehicle moving forward may detect an occluding object on a side and in front of the vehicle by means of the occluding object detection module. In the present application, the occluding object refers to an object that is capable of occluding the perceived field of view of a vehicle, and is moving slowly or stationary (i.e., a movement speed thereof is less than or equal to a first threshold).

In the present application, the occluding object detection module may detect the occluding object in the following manner: calculating the area occluded by the occluding object according to a height, a position and a visible range of a vehicle sensor and an orientation and a height of the occluding object; and determining that the occluding object is detected if a length, a width and a height of the occluded area are greater than respective thresholds.

A self-driving vehicle usually moves along a planned path. Thus, in the step 201, if the occluding object detection module detects that there is an occluding object on a side and in front of the vehicle, the occluding object detection module may determine the hard brake speed limit point and the potential collision point according to the planned path of the vehicle and position information of the occluding object.

Both the hard brake speed limit point and the potential collision point are on the planned path of the vehicle. The potential collision point refers to a position where a collision between a moving object suddenly moving in front of the vehicle and the vehicle is likely to occur. The hard brake speed limit point refers to a position where the vehicle, upon detecting the moving object, performs hard braking to avoid the collision with the moving object at the potential collision point.

The positions of the hard brake speed limit point and the potential collision point are related to the position and size of the occluding object, therefore the distance between the hard brake speed limit point and the potential collision point is also related to the position and size of the occluding object. The positions of the hard brake speed limit point and the potential collision point may be determined according to the position information of the occluding object detected by the occluding object detection module, and then the distance between the hard brake speed limit point and the potential collision point may be calculated based on the positions of the hard brake speed limit point and the potential collision point.

Figure 3:
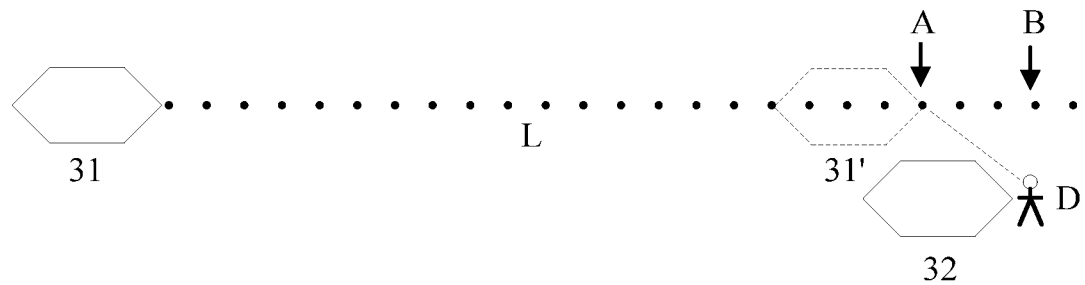
FIG. 3 is a schematic diagram illustrating how a vehicle determines a hard brake speed limit point and a potential collision point according to a first embodiment of the present application.

The present application may determine the hard brake speed limit point and the potential collision point according to the position information of the closest point and the occluding object. As shown in FIG. 3, a first vehicle 31 travels along a planned path L. Taking a second vehicle 32 parking at the roadside as an example of the occluding object, a hard brake speed limit point A is generally in a transverse region corresponding to a middle part of the second vehicle 32, and a potential collision point B is generally in a transverse region which is at a distance from the front end of the second vehicle 32. When the first vehicle 31 moves to the hard brake speed limit point A (i.e., the first vehicle 31' shown in FIG. 3), the first vehicle 31 may sense a moving object D in the occluded area. To be on the safe side, a transverse position corresponding to a front edge of the occluding object may be used as the position of the potential collision point. In other words, a position in the planned path L of the first vehicle 31 where the potential moving object D moving from a position in front of and adjacent to the second vehicle 32 reaches the planned path L is used as the potential collision point B.

In the step 202, a speed limit value of the hard brake speed limit point may be calculated based on the distance between the hard brake speed limit point and the potential collision point. The speed limit value needs to satisfy the condition that, in the case that a moving object suddenly moves into the planned path of the vehicle, the vehicle may be stopped through hard braking before the vehicle hits the moving object (that is, before the potential collision point is reached). Specifically, the collision risk detection module may be used to calculate the speed limit value of the hard brake speed limit point based on the distance between the hard brake speed limit point and the potential collision point, and judge whether the planned speed of the vehicle at the hard brake speed limit point meets the speed limit value of the hard brake speed limit point, to determine whether there is a risk of collision.

After the speed limit value of the hard brake speed limit point is calculated, it may be determined whether the planned speed of the vehicle at the hard brake speed limit point is less than or equal to the speed limit value. If the planned speed of the vehicle at the hard brake speed limit point is less than or equal to the speed limit value, there is no risk of collision, and the vehicle may move at the planned speed (i.e., the step 203 is performed).

According to the technique of the embodiment of the present application, a vehicle, when moving forward, detects an occluding object, determines a hard brake speed limit point and a potential collision point according to a planned path of the vehicle and position information of the occluding object, and calculates a speed limit value of the hard brake speed limit point. Thus, a potential risk of collision of a moving vehicle as a result of occlusion of an occluding object can be predicted, and the safety of vehicle autonomous driving can be improved.

Optionally, after the calculating the speed limit value of the hard brake speed limit point, the method further includes in a case that the planned speed of the vehicle at the hard brake speed limit point is greater than the speed limit value, performing speed control on the vehicle, such that a speed of the vehicle at the hard brake speed limit point is less than or equal to the speed limit value.

As described above, after the speed limit value of the hard brake speed limit point is calculated, it may be judged whether the planned speed of the vehicle at the hard brake speed limit point is less than or equal to the speed limit value.

In this implementation, if the planned speed of the vehicle at the hard brake speed limit point is greater than the speed limit value, there is a risk of collision. To prevent the potential risk of collision, it is necessary to stop the vehicle safely before the vehicle hits a moving object suddenly moving to a position in front of the vehicle when the vehicle is in a position where the area occluded by the occluding object can be detected.

In view of this, speed control of the vehicle may be performed, so that a speed of the vehicle at the hard brake speed limit point is less than or equal to the speed limit value, to prevent the potential risk of collision of the vehicle.

In this implementation, the speed control of the vehicle not only allows the vehicle to effectively avoid the potential risk of collision as a result of occlusion of an occluding object, but also allows the vehicle to move along the originally planned path, thereby not only improving the safety of vehicle autonomous driving, but also ensuring the programmability and stability of vehicle autonomous driving.

It is noted, in a case that the potential risk of collision as a result of occlusion of an occluding object is predicted, in addition to performing the speed control of the vehicle so that a speed of the vehicle at the hard brake speed limit point is less than or equal to the speed limit value, the present application can adopt other control strategies, such as stopping the vehicle, or changing the planned path.

In the present application, the collision risk detection module may perform two-stage collision risk detection, wherein the first stage corresponds to the judgement as to whether the planned speed of the vehicle at the hard brake speed limit point meets the speed limit value of the hard brake speed limit point. If the planned speed of the vehicle at the hard brake speed limit point does not meet the speed limit value of the hard brake speed limit point, the second stage of collision risk detection needs to be performed.

A process of the second stage of collision risk detection, refers to the following implementation.

Optionally, performing the speed control on the vehicle includes calculating a first deceleration distance according to a current speed of the vehicle, the speed limit value and a preset first deceleration rate, where the first deceleration distance is a distance required for the vehicle to decelerate from the current speed to the speed limit value at the preset first deceleration rate. Also, in a case that the first deceleration distance is less than a distance between a current position of the vehicle and the hard brake speed limit point, the vehicle is controlled to decelerate at the preset first deceleration rate.

The preset first deceleration rate is a deceleration rate preconfigured for the vehicle taking the passenger's comfort into consideration. When the braking is performed at the first deceleration rate, the movement speed of the vehicle changes gently, and the vehicle is in a slow braking state.

Thus, with the passenger's experience in mind, the implementation performs the second stage of collision risk detection. That is, if there is a risk of collision, it is firstly judged whether the risk of collision can be avoided by braking the vehicle slowly. If so, the vehicle is controlled to brake slowly, in other words, the vehicle is controlled to decelerate at the first deceleration rate.

Specifically, a distance (i.e., the first deceleration distance) required for the vehicle to decelerate from the current speed to the speed limit value at the preset first deceleration rate may be calculated according to the current speed of the vehicle, the speed limit value and the first deceleration rate, and it may be judged whether the first deceleration distance is less than a distance between a current position of the vehicle and the hard brake speed limit point. The first deceleration distance being less than the distance between the current position of the vehicle and the hard brake speed limit point indicates that the risk of collision can be avoided by braking the vehicle slowly. As a result, the vehicle may be controlled to decelerate at the first deceleration rate.

Further, to avoid the risk of collision to the maximum extent, a reserved response distance may be preconfigured taking a response time from the detection of an occluding object to the actual braking into account, and it is judged whether the first deceleration distance plus the reserved response distance is less than the distance between the current position of the vehicle and the hard brake speed limit point.

Through the implementation, not only the risk of collision can be avoided, but also the comfort experience of the passenger can be ensured.

Optionally, the method further includes in a case that the first deceleration distance is not less than the distance between the current position of the vehicle and the hard brake speed limit point, calculating a second deceleration rate according to the current speed of the vehicle, the speed limit value and the distance between the current position of the vehicle and the hard brake speed limit point, and controlling the vehicle to decelerate at the second deceleration rate.

In the present application, if the risk of collision still cannot be avoided after the two-stage collision risk detection, the collision risk detection module may send a collision risk signal. Having received the collision risk signal, the collision risk avoidance module may calculate a required deceleration rate based on the distance from the current position to the hard brake speed limit point, and send the required deceleration rate to the control and arbitration module. The control and arbitration module issues a control instruction to control the vehicle.

Specifically, in this implementation, the first deceleration distance being not less than the distance between the current position of the vehicle and the hard brake speed limit point indicates that the risk of collision cannot be avoided by braking the vehicle slowly. As a result, the deceleration rate of the vehicle needs to be increased. The second deceleration rate may be calculated by the collision risk avoidance module according to the current speed of the vehicle, the speed limit value and the distance between the current position and the hard brake speed limit point, and the vehicle is controlled by the control and arbitration module to decelerate at the second deceleration rate.

Through this implementation, the risk of collision can be avoided.

Optionally, the method further includes in a case that the vehicle detects that there is an object moving towards the planned path of the vehicle in the area occluded by the occluding object, controlling the vehicle to perform a hard braking operation.

In this implementation, when the vehicle arrives at the hard brake speed limit point, the vehicle can detect the area occluded by the occluding object. If the vehicle detects that there is an object moving towards the planned path of the vehicle (i.e., moving object) in the area occluded by the occluding object, the vehicle is controlled to perform a hard braking operation. In this way, a collision between the vehicle and the moving object can be avoided.

Optionally, a transverse distance between the occluding object and the planned path of the vehicle is less than or equal to a second threshold.

In the present application, the vehicle may acquire a sensing result of the occluding objects in the perimeter of the vehicle through the occluding object detection module. In this implementation, to improve control efficiency, the detected occluding objects may be filtered. For an occluding object at a relatively large transverse distance to the planned path of the vehicle, even if a moving object suddenly emerges from the occluded area, thanks to the relatively large transverse distance to the planned path of the vehicle, there is a relatively low probability of collision between the vehicle and the moving object, that is, the potential risk of collision is low. Therefore, the occluding objects at a transverse distance to the planned path of the vehicle which is greater than the second threshold may be filtered out, and only those at a transverse distance to the planned path of the vehicle which is less than or equal to the second threshold are of interest.

Optionally, the occluding object is greater than or equal to 0.5 meters in length, greater than or equal to 0.3 meters in width, and greater than or equal to 1.0 meter in height.

In the autonomous driving scenario, the moving object posing a risk of collision is generally a pedestrian, or a bicyclist. Considering the characteristics of pedestrians, an occluding object liable to occlude a pedestrian is usually of a size greater than or equal to 0.5 meters in length, greater than or equal to 0.3 meters in width, and greater than or equal to 1.0 meter in height. Therefore, in this implementation, to improve control efficiency, the detected occluding objects may be filtered to get rid of those occluding objects incapable of occluding a pedestrian, so that only the occluding objects capable of occluding a pedestrian, such as a car parking at the roadside or a slowly moving vehicle, are paid attention.

It is noted, the multiple optional implementations of the vehicle control method in this application may be implemented in a combined manner, or implemented separately, which is not limited in this application.

The foregoing embodiments of the present application at least have the following advantages or beneficial effects.

According to the technique of the present application, a vehicle, when moving forward, detects an occluding object, determines a hard brake speed limit point and a potential collision point according to a planned path of the vehicle and position information of the occluding object, and calculates a speed limit value of the hard brake speed limit point. Thus, a potential risk of collision of a moving vehicle as a result of occlusion of an occluding object can be predicted, and the safety of vehicle autonomous driving can be improved.

Figure 4:
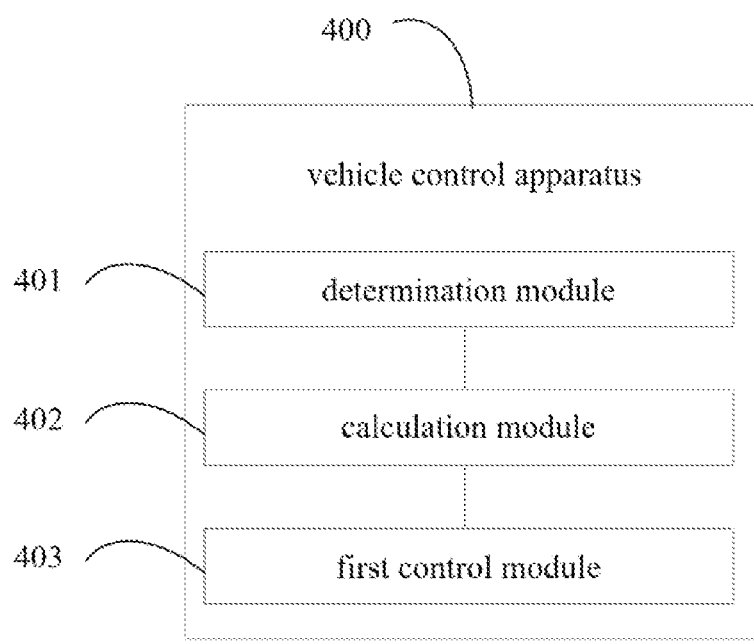
FIG. 4 is a schematic structure diagram of a vehicle control apparatus according to a second embodiment of the present application.

As shown in FIG. 4, the present application provides a vehicle control apparatus 400, including a determination module 401, configured to, when a vehicle is moving, in a case that an occluding object is detected, determine a hard brake speed limit point and a potential collision point according to a planned path of the vehicle and position information of the occluding object, where a movement speed of the occluding object is less than or equal to a first threshold, and the hard brake speed limit point is a closest position where an area occluded by the occluding object is detectable. The vehicle control apparatus 400 further includes a calculation module 402, configured to calculate a speed limit value of the hard brake speed limit point based on a distance between the hard brake speed limit point and the potential collision point. The vehicle control apparatus also includes a first control module 403, configured to, in a case that a planned speed of the vehicle at the hard brake speed limit point is less than or equal to the speed limit value, control the vehicle to move at the planned speed.

Optionally, the vehicle control apparatus 400 further includes a second control module, configured to, in a case that the planned speed of the vehicle at the hard brake speed limit point is greater than the speed limit value, perform speed control on the vehicle, such that a speed of the vehicle at the hard brake speed limit point is less than or equal to the speed limit value.

Optionally, the second control module includes a first calculation unit, and a first control unit. The first calculation unit is configured to calculate a first deceleration distance according to a current speed of the vehicle, the speed limit value and a preset first deceleration rate, where the first deceleration distance is a distance required for the vehicle to decelerate from the current speed to the speed limit value at the preset first deceleration rate. The first control unit is configured to, in a case that the first deceleration distance is less than a distance between a current position of the vehicle and the hard brake speed limit point, control the vehicle to decelerate at the preset first deceleration rate.

Optionally, the second control module further includes a second calculation unit and a second control unit. The second calculation unit is configured to, in a case that the first deceleration distance is not less than the distance between the current position of the vehicle and the hard brake speed limit point, calculate a second deceleration rate according to the current speed of the vehicle, the speed limit value and the distance between the current position of the vehicle and the hard brake speed limit point. The second control unit is configured to control the vehicle to decelerate at the second deceleration rate.

Optionally, the vehicle control apparatus 400 further includes a third control module, configured to, in a case that the vehicle detects that there is an object moving towards the planned path of the vehicle in the area occluded by the occluding object, control the vehicle to perform a hard braking operation.

Optionally, a transverse distance between the occluding object and the planned path of the vehicle is less than or equal to a second threshold.

Optionally, the occluding object is greater than or equal to 0.5 meters in length, greater than or equal to 0.3 meters in width, and greater than or equal to 1.0 meter in height.

The vehicle control apparatus 400 provided in the embodiments of this application may implement each process of the foregoing embodiments of the vehicle control method, and may achieve the same beneficial effects. To avoid redundancy, a detailed description is omitted herein.

According to embodiments of this application, this application further provides an electronic device and a readable storage medium.

According to embodiments of this application, this application further provides an electronic device, a readable storage medium and a computer program product.

Figure 5:
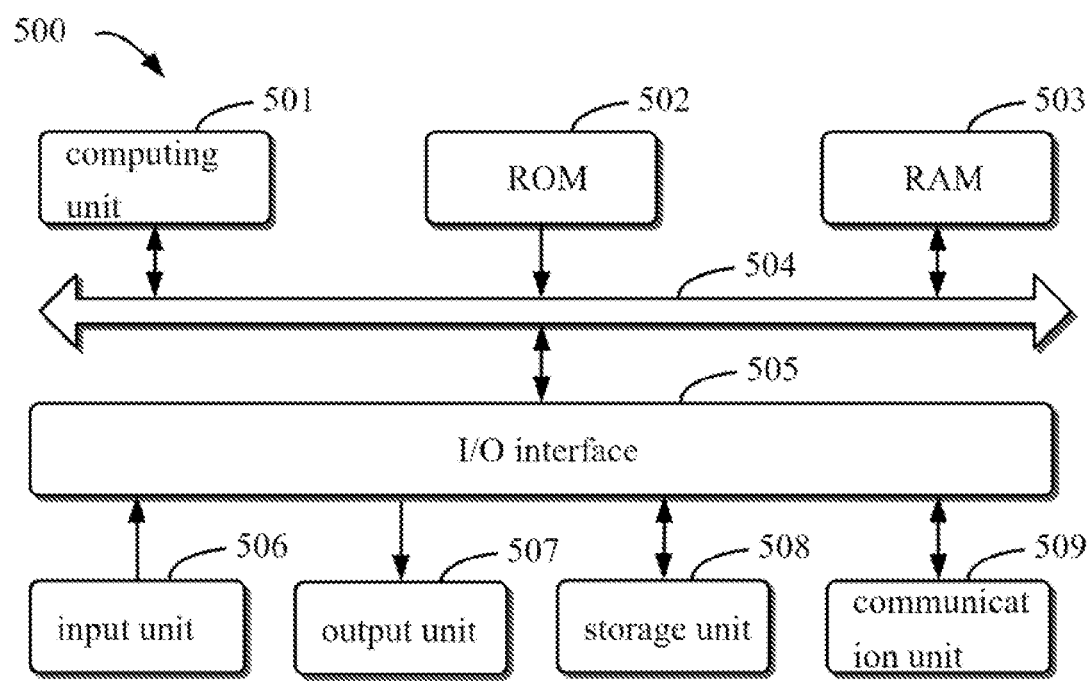
FIG. 5 is a block diagram of an electronic device configured to implement the vehicle control method according to embodiments of the present application.

Referring to FIG. 5, a block diagram of an exemplary electronic device 500 configured to implement the embodiments of this disclosure is illustrated. The electronic device is intended to represent various forms of digital computers, such as laptop computer, desktop computer, workstation, personal digital assistant, server, blade server, mainframe and other suitable computers. The electronic device may represent various forms of mobile devices as well, such as personal digital processing device, cellular phone, smart phone, wearable device and other similar computing devices. The components, the connections and relationships therebetween and the functions thereof described herein are merely exemplary, and are not intended to limit the implementation of this application described and/or claimed herein.

As shown in FIG. 5, the electronic device 500 includes a computing unit 501. The computing unit 501 may carry out various suitable actions and processes according to a computer program stored in a read-only memory (ROM) 502 or a computer program loaded from a storage unit 508 into a random access memory (RAM) 503. The RAM 503 may as well store therein all kinds of programs and data required for the operation of the device 500. The computing unit 501, the ROM 502 and the RAM 503 are connected to each other through a bus 504. An input/output (I/O) interface 505 is also connected to the bus 504.

Multiple components in the device 500 are connected to the I/O interface 505. The multiple components include: an input unit 506, e.g., a keyboard, a mouse and the like; an output unit 507, e.g., a variety of displays, loudspeakers, and the like; a storage unit 508, e.g., a magnetic disk, an optical disc and the like; and a communication unit 509, e.g., a network card, a modem, a wireless transceiver, and the like. The communication unit 509 allows the device 500 to exchange information/data with other devices through a computer network, such as the Internet, and/or other telecommunication networks.

The computing unit 501 may be any general purpose and/or special purpose processing components having a processing and computing capability. Some examples of the computing unit 501 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 501 carries out the aforementioned methods and processes, e.g., the vehicle control method. For example, in some embodiments, the vehicle control method may be implemented as a computer software program tangibly embodied in a machine readable medium, such as the storage unit 508. In some embodiments, all or a part of the computer program may be loaded to and/or installed on the device 500 through the ROM 502 and/or the communication unit 509. When the computer program is loaded into the RAM 503 and executed by the computing unit 501, one or more steps of the foregoing vehicle control method may be implemented. Optionally, in other embodiments, the computing unit 501 may be configured in any other suitable manner (e.g., by means of a firmware) to implement the vehicle control method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN), the Internet and a blockchain network.

The computer system can include a client and a server. The client and server are generally remote from each other and typically interact through a communication network. The relationship of client and server arises by virtue of computer programs running on respective computers and having a client-server relationship to each other. The server can be a cloud server, also known as a cloud computing server or a cloud host, which is a host product in the cloud computing service system to solve the defect of difficult management and weak business scalability in traditional physical host and VPS service ("Virtual Private Server", or "VPS" for short). The server can also be a server of a distributed system, or a server combined with a blockchain.

According to an embodiment of the present application, the present application further provides a self-driving vehicle including the electronic device of the present application. The self-driving vehicle may be controlled by the vehicle control method of the present application. For an architecture of the self-driving vehicle, refer to FIG. 1.

It is appreciated, all forms of processes shown above may be used, and steps thereof may be reordered, added or deleted. For example, as long as expected results of the technical solutions of the present application can be achieved, steps set forth in the present application may be performed in parallel, performed sequentially, or performed in a different order, and there is no limitation in this regard.

The foregoing specific implementations constitute no limitation on the scope of the present application. It is appreciated by those skilled in the art, various modifications, combinations, sub-combinations and replacements may be made according to design requirements and other factors. Any modifications, equivalent replacements and improvements made without deviating from the spirit and principle of the present application shall be deemed as falling within the scope of the present application.

What is claimed is:

1. A vehicle control method, comprising:
    when a vehicle is moving, in a case that an occluding object is detected, determining a hard brake speed limit point and a potential collision point according to a planned path of the vehicle and position information of the occluding object, wherein a movement speed of the occluding object is less than or equal to a first threshold, and the hard brake speed limit point is a closest position where an area occluded by the occluding object is detectable; wherein the first threshold is less than a current speed of the vehicle;
    calculating a speed limit value of the hard brake speed limit point based on a distance between the hard brake speed limit point and the potential collision point; and
    in a case that a planned speed of the vehicle at the hard brake speed limit point is less than or equal to the speed limit value, controlling the vehicle to move at the planned speed;
    wherein before determining the hard brake speed limit point and the potential collision point according to the planned path of the vehicle and the position information of the occluding object, the method further comprises:
    filtering out each occluding object whose transverse distance from the planned path of the vehicle is greater than a second threshold, and filtering out each said occluding object incapable of occluding a pedestrian, wherein each said occluding object incapable of occluding the pedestrian is less than 0.5 meters in length, less than 0.3 meters in width, and less than 1.0 meter in height.

2. The vehicle control method according to claim 1, wherein, after calculating the speed limit value of the hard brake speed limit point, the method further comprises:
    in a case that the planned speed of the vehicle at the hard brake speed limit point is greater than the speed limit value, performing speed control on the vehicle, such that a speed of the vehicle at the hard brake speed limit point is less than or equal to the speed limit value.

3. The vehicle control method according to claim 2, wherein performing the speed control on the vehicle comprises:
    calculating a first deceleration distance according to the current speed of the vehicle, the speed limit value and a preset first deceleration rate, wherein the first deceleration distance is a distance required for the vehicle to decelerate from the current speed to the speed limit value at the preset first deceleration rate;
    in a case that the first deceleration distance is less than a distance between a current position of the vehicle and the hard brake speed limit point, controlling the vehicle to decelerate at the preset first deceleration rate.

4. The vehicle control method according to claim 3, further comprising:
    in a case that the first deceleration distance is not less than the distance between the current position of the vehicle and the hard brake speed limit point, calculating a second deceleration rate according to the current speed of the vehicle, the speed limit value and the distance between the current position of the vehicle and the hard brake speed limit point; and
    controlling the vehicle to decelerate at the second deceleration rate.

5. The vehicle control method according to claim 1, further comprising:
    in a case that the vehicle detects that there is an object moving towards the planned path of the vehicle in the area occluded by the occluding object, controlling the vehicle to perform a hard braking operation.

6. An electronic device, comprising:
at least one processor; and
a memory communicatively connected to the at least one processor; wherein,
the memory stores instructions executable by the at least one processor, and the instructions are executed by the at least one processor to cause the at least one processor to implement:
when a vehicle is moving, in a case that an occluding object is detected, determining a hard brake speed limit point and a potential collision point according to a planned path of the vehicle and position information of the occluding object, wherein a movement speed of the occluding object is less than or equal to a first threshold, and the hard brake speed limit point is a closest position where an area occluded by the occluding object is detectable; wherein the first threshold is less than a current speed of the vehicle;
calculating a speed limit value of the hard brake speed limit point based on a distance between the hard brake speed limit point and the potential collision point;
in a case that a planned speed of the vehicle at the hard brake speed limit point is less than or equal to the speed limit value, controlling the vehicle to move at the planned speed;
wherein before determining the hard brake speed limit point and the potential collision point according to the planned path of the vehicle and the position information of the occluding object, the instructions are executed by the at least one processor to cause the at least one processor to:
filter out each occluding object whose transverse distance from the planned path of the vehicle is greater than a second threshold, and filter out each said occluding object incapable of occluding a pedestrian, wherein each said occluding object incapable of occluding the pedestrian is less than 0.5 meters in length, less than 0.3 meters in width, and less than 1.0 meter in height.

7. The electronic device according to claim 6, wherein the instructions are executed by the at least one processor to cause the at least one processor to implement:
in a case that the planned speed of the vehicle at the hard brake speed limit point is greater than the speed limit value, performing speed control on the vehicle, such that a speed of the vehicle at the hard brake speed limit point is less than or equal to the speed limit value.

8. The electronic device according to claim 7, wherein the instructions are executed by the at least one processor to cause the at least one processor to implement:
calculating a first deceleration distance according to the current speed of the vehicle, the speed limit value and a preset first deceleration rate, wherein the first deceleration distance is a distance required for the vehicle to decelerate from the current speed to the speed limit value at the preset first deceleration rate; and
in a case that the first deceleration distance is less than a distance between a current position of the vehicle and the hard brake speed limit point, controlling the vehicle to decelerate at the preset first deceleration rate.

9. The electronic device according to claim 8, wherein the instructions are executed by the at least one processor to cause the at least one processor to implement:
in a case that the first deceleration distance is not less than the distance between the current position of the vehicle and the hard brake speed limit point, calculating a second deceleration rate according to the current speed of the vehicle, the speed limit value and the distance between the current position of the vehicle and the hard brake speed limit point; and
controlling the vehicle to decelerate at the second deceleration rate.

10. The electronic device according to claim 6, wherein the instructions are executed by the at least one processor to cause the at least one processor to implement:
in a case that the vehicle detects that there is an object moving towards the planned path of the vehicle in the area occluded by the occluding object, controlling the vehicle to perform a hard braking operation.

11. A self-driving vehicle, comprising an electronic device;
wherein the electronic device comprises:
at least one processor; and
a memory communicatively connected to the at least one processor; wherein,
the memory stores instructions executable by the at least one processor, and the instructions are executed by the at least one processor to cause the at least one processor to implement:
when a vehicle is moving, in a case that an occluding object is detected, determining a hard brake speed limit point and a potential collision point according to a planned path of the vehicle and position information of the occluding object, wherein a movement speed of the occluding object is less than or equal to a first threshold, and the hard brake speed limit point is a closest position where an area occluded by the occluding object is detectable; wherein the first threshold is less than a current speed of the vehicle;
calculating a speed limit value of the hard brake speed limit point based on a distance between the hard brake speed limit point and the potential collision point; and
in a case that a planned speed of the vehicle at the hard brake speed limit point is less than or equal to the speed limit value, controlling the vehicle to move at the planned speed;
wherein before determining the hard brake speed limit point and the potential collision point according to the planned path of the vehicle and the position information of the occluding object, the instructions are executed by the at least one processor to cause the at least one processor to implement:
filtering out each occluding object whose transverse distance from the planned path of the vehicle is greater than a second threshold, and filtering out each said occluding object incapable of occluding a pedestrian, wherein each said occluding object incapable of occluding the pedestrian is less than 0.5 meters in length, less than 0.3 meters in width, and less than 1.0 meter in height.

12. The self-driving vehicle according to claim 11, wherein the instructions are executed by the at least one processor to cause the at least one processor to implement:
in a case that the planned speed of the vehicle at the hard brake speed limit point is greater than the speed limit value, performing speed control on the vehicle, such that a speed of the vehicle at the hard brake speed limit point is less than or equal to the speed limit value.

13. The self-driving vehicle according to claim 12, wherein the instructions are executed by the at least one processor to cause the at least one processor to implement:
calculating a first deceleration distance according to the current speed of the vehicle, the speed limit value and a preset first deceleration rate, wherein the first deceleration distance is a distance required for the vehicle to decelerate from the current speed to the speed limit value at the preset first deceleration rate; and in a case that the first deceleration distance is less than a distance between a current position of the vehicle and the hard brake speed limit point, controlling the vehicle to decelerate at the preset first deceleration rate.

14. The self-driving vehicle according to claim 13, wherein the instructions are executed by the at least one processor to cause the at least one processor to implement:

in a case that the first deceleration distance is not less than the distance between the current position of the vehicle and the hard brake speed limit point, calculating a second deceleration rate according to the current speed of the vehicle, the speed limit value and the distance between the current position of the vehicle and the hard brake speed limit point; and controlling the vehicle to decelerate at the second deceleration rate.

\* \* \* \* \*